G. E. MIGNON.
MEANS FOR TEACHING BAYONET EXERCISES, FIGHTING, AND DRILL.
APPLICATION FILED FEB. 7, 1920.

1,357,791.

Patented Nov. 2, 1920.

Witnesses
Rosina J. Finotti

Inventor
George Elonis Mignon
By Sturtevant & Mason,
Attorneys

G. E. MIGNON.
MEANS FOR TEACHING BAYONET EXERCISES, FIGHTING, AND DRILL.
APPLICATION FILED FEB. 7, 1920.

1,357,791.  Patented Nov. 2, 1920.
2 SHEETS—SHEET 2.

UNITED STATES PATENT OFFICE.

GEORGE ELOUIS MIGNON, OF WANSTEAD, ENGLAND.

MEANS FOR TEACHING BAYONET EXERCISES, FIGHTING, AND DRILL.

1,357,791.  Specification of Letters Patent.  Patented Nov. 2, 1920.

Application filed February 7, 1920. Serial No. 356,945.

*To all whom it may concern:*

Be it known that I, GEORGE ELOUIS MIGNON, a subject of the King of Great Britain, residing in Wanstead, in the county of Essex and Kingdom of England, have invented certain new and useful Improved Means for Teaching Bayonet Exercises, Fighting, and Drill, of which the following is a specification.

The present invention relates to an improved exerciser and device for teaching bayonet fighting and drill.

The invention consists in a dummy provided with a stick or other equivalent for a bayonet, hereafter termed a stick, so arranged that it can be fixed by the operator, *i. e.* the instructor in one or preferably a plurality of defensive positions in such manner that when the stick is correctly parried, it drops into a normal position which may be the position "on guard at the throat" by gravity.

The invention further consists in a dummy provided with a stick which can be set by the operator in one or preferably a plurality of defensive positions in such manner as to be held there by a spring catch which allows the stick to be disengaged from either side so that disengagement will take place when the stick is parried on either side.

The invention will now be described in one form by way of example with reference to the accompanying drawings in which:—

Figure 1:
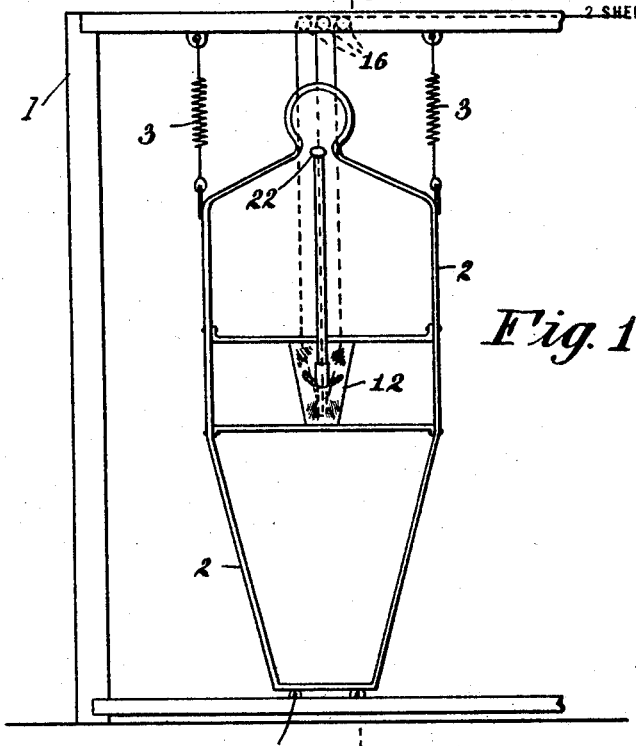
Figure 1 represents a front view of the device.

In the drawings, 1 is a gallows upon which a metal frame 2 is mounted by links 4 and spiral springs 3. This frame is made roughly in the shape of a man and is padded in front with straw or other suitable padding 4ª.

Figure 4:
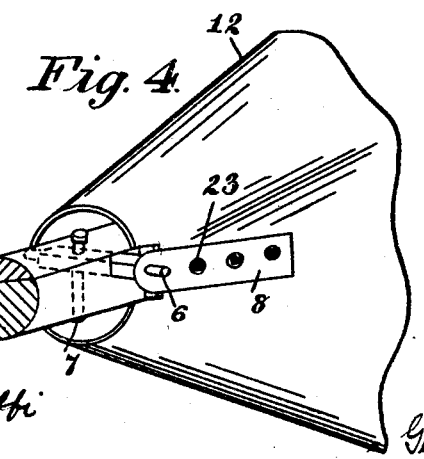
Fig. 4 is an external detail view of part of Fig. 2 in perspective.

The stick 5, provided with a cap or ball 22, is pivoted within a conical box 12 in the manner shown in Fig. 4, viz:—by a horizontal pivot 6 and a vertical pivot 7 so as to be capable of movement in both the vertical and horizontal directions. The pivot 6 is mounted within a plate 8 which can be moved forward or backward in order to adjust the device by attaching to the bolt 23 as desired.

Figure 2:
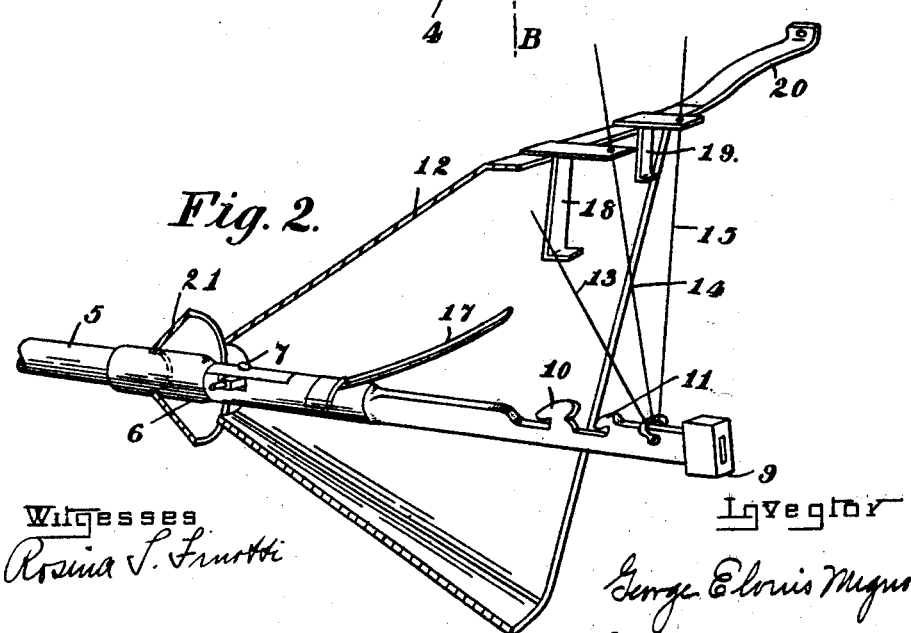
Fig. 2 is a perspective view of part of the interior of the box containing the catch mechanism.
Figure 3:
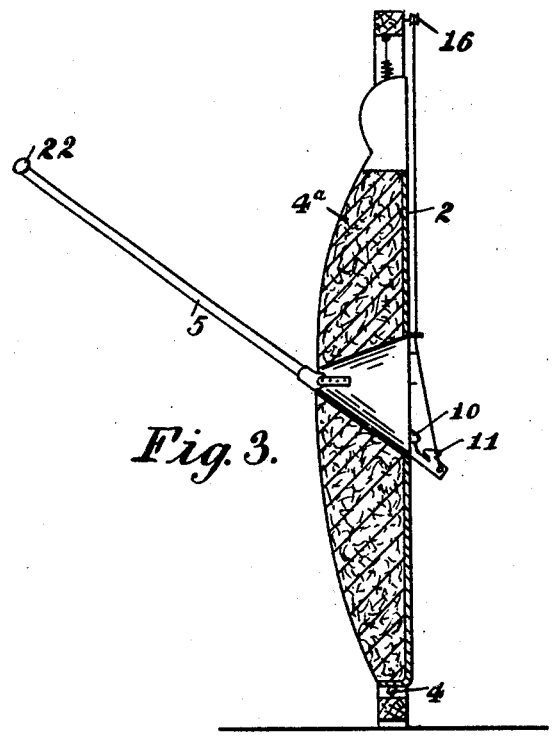
Fig. 3 is a section through Fig. 1, and the line A B.

Fig. 2 shows the interior of the conical box 12. Outside the stick is provided with a conical guard 21 and inside this is counterbalanced by the weight 9 or equivalent and provided with a leaf spring 17 to assist its downward movement when released as hereafter described.

The catch provided consists of beaks 10 and 11 having cam shaped upper surfaces and recesses below. The top of the box is formed by a member 20 which is bent in such manner that the stick is presented as if it were held by a right handed man. From this stick depend three J springs, only two of which, 18 and 19, are visible in Fig. 2. The third spring is on the other side of the central spring 18 at the same distance as the spring 19. Cables 13, 14 and 15 pass through holes in the horizontal sockets at the upper portions of the three springs and these cables pass over suitable pulleys 16 to the point at which they are controlled by the instructor.

It will be seen that when the cable 14 is pulled, the stick is raised and the cam surface of the beak 10 rides over the under side of the spring 18 which then catches in the recess beneath. Similarly the cable 15 causes the beak 11 to catch over the spring 19 while the cable 13 causes the beak 11 to engage the first spring which is not shown.

The three springs cause the stick to assume the three positions " on guard," low down at the left, at the abdomen, and low down at the right.

In operation the stick is pulled into one of the above mentioned defensive positions by the operation of one of the cables. The person undergoing instruction is then told to attack the dummy but first to deliver the correct parry. It will be seen that if the stick is struck laterally on either side near the guard 21, the beak inside will be disengaged from its spring and assisted by the leaf spring 17, the weight 9 will fall by gravity and lift the stick into the position " on guard at the throat."

The advantages of this construction are obvious. The person undergoing instruction may be told to attack the device and it may then be set rapidly into any one of a number of defensive positions. He will then be obliged to deliver the correct parry with sufficient vigor to dislodge the beak from the spring. If the correct parry has not been given before the person undergoing instruction attacks the body of the dummy, the instructor will be able to see that the parry has not been delivered by the fact that the stick remains with the beak still engaging the spring.

While the device has been described with reference to three defensive positions other than the normal position " on guard at the throat," it will be obvious that more or less of such positions could be provided for. The gallows 1 preferably contains a plurality of dummies and if desired these may all be controlled from a common device by a single set of operating handles, i. e. by connecting the center cable of such device and so on.

I declare that what I claim is:—

1. A device for teaching bayonet fighting and drill and an exerciser comprising a dummy, a stick, means to retain said stick in a defensive position until the correct parry has been given, and means to restore said stick to said defensive position.

2. A device for teaching bayonet fighting and drill and an exerciser comprising a dummy, a stick, means to set said stick in one of a plurality of defensive positions, and means to retain said stick in said position until forcibly dislodged by the correct parry.

3. A device for teaching bayonet fighting comprising a dummy, a stick, a catch to hold said stick in a defensive position and a weight on said stick to throw the stick into a normal position when dislodged from the catch by application of the correct parry.

4. A device for teaching bayonet fighting comprising a dummy, a stick, means to hold said stick in a defensive position until forcibly dislodged by the correct parry, and a release spring to assist the movement of the stick when dislodged.

5. A device for teaching bayonet fighting comprising a dummy, a stick and a J-spring holding said stick in a defensive position until dislodged by the correct parry.

6. A device for teaching bayonet fighting comprising a dummy, a stick, a beak on said stick having an upper cam surface over a recess, and a J-spring adapted to engage in said recess to retain the stick in a defensive position.

7. A device for teaching bayonet fighting comprising a dummy, a stick, a beak on said stick having an upper cam surface over a recess, and a J-spring adapted to engage in said recess to retain the stick in a defensive position with a cable attached to the stick and adapted to pass through a perforation adjacent the J-spring.

8. A device for teaching bayonet fighting comprising a dummy, a stick, a universal joint on which said stick is mounted and means to retain the stick in at least one defensive position until forcibly dislodged by the correct parry.

9. A device for teaching bayonet fighting comprising a dummy, a stick, an adjustable mount for said stick and means to retain said stick in a defensive position until forcibly dislodged by the correct parry.

10. A device for teaching bayonet fighting comprising a dummy, a stick, means to shift the stick from a normal position into a defensive position, a cable controlling said means, means to retain the stick in said defensive position until it is forcibly dislodged by the correct parry, and automatic means to restore said stick when dislodged into the normal position.

In witness whereof, I have hereunto signed my name this 22 day of January 1920, in the presence of two subscribing witnesses.

GEORGE ELOUIS MIGNON.

Witnesses:
HAROLD E. POTTS,
J. McLACHLAN.